US012671579B2

(12) United States Patent
Krishnamurthy et al.

(10) Patent No.: US 12,671,579 B2
(45) Date of Patent: Jun. 30, 2026

(54) SYNCHRONIZING AN ENCRYPTED DATA STREAM ACROSS CHIP-TO-CHIP GROUND REFERENCED SIGNALING INTERCONNECT

(71) Applicant: NVIDIA Corporation, Santa Clara, CA (US)

(72) Inventors: Adithya Hrudhayan Krishnamurthy, Sunnyvale, CA (US); Ish Chadha, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 144 days.

(21) Appl. No.: 18/615,933

(22) Filed: Mar. 25, 2024

(65) Prior Publication Data

US 2025/0300827 A1 Sep. 25, 2025

(51) Int. Cl.
*H04L 9/12* (2006.01)

(52) U.S. Cl.
CPC ..................................... *H04L 9/12* (2013.01)

(58) Field of Classification Search
CPC . H04L 9/12; H04L 9/32; H04L 9/3226; H04L 9/3228; H04L 9/3234; H04L 9/40
See application file for complete search history.

(56) References Cited

U.S. PATENT DOCUMENTS

| | | | | |
|---|---|---|---|---|
| 5,987,137 A | * | 11/1999 | Karppanen | ............... H04L 9/12 |
| | | | | 380/37 |
| 8,417,936 B2 | * | 4/2013 | Iwao | ......................... H04L 9/12 |
| | | | | 713/150 |
| 8,515,069 B2 | * | 8/2013 | Kuo | ...................... H04J 3/0667 |
| | | | | 713/168 |
| 10,104,047 B2 | * | 10/2018 | Muma | ................. H04L 63/0428 |
| 11,087,717 B2 | * | 8/2021 | Wu | ........................... G09G 5/12 |
| 11,797,693 B2 | * | 10/2023 | Meyer | ..................... H04L 63/12 |
| 2010/0153742 A1 | * | 6/2010 | Kuo | ...................... H04J 3/0667 |
| | | | | 713/189 |

* cited by examiner

*Primary Examiner* — Hosuk Song
(74) *Attorney, Agent, or Firm* — Lowenstein Sandler LLP

(57) ABSTRACT

A device includes a memory to store a session key, a transmitter (TX) physical layer to transmit frames to a second device over a link, and TX datalink logic coupled to the TX physical layer and the memory. To coordinate synchronized encryption over the link with the second device, the TX datalink logic is to cause a key synchronization frame to be transmitted to the second device, wherein the key synchronization frame comprises a frame count value. The TX datalink logic, in response to receipt of a key synchronization acknowledgement from the second device acknowledging receipt of the key synchronization frame, is further to start encrypting frame data with the session key after transmitting a number of frames corresponding to the frame count value.

25 Claims, 12 Drawing Sheets

100

Link
103

300A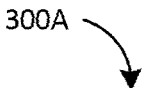

Unencrypted Frame 310

| Flit 1 319A | Header Field 311 | Client Data 312A | |
| Flit 2 319B | Client Data 312B | | |
| . . . | . . . | | |
| Flit N-1 319M | Client Data 312M | | |
| Flit N 319N | Client Data 312N | Error Check Field 313 | |

FIG. 3A

300B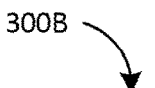

Encrypted Frame 320

| Flit 1 329A | Header Field 321 | Client Data 322A | |
| Flit 2 329B | Client Data 322B | | |
| . . . | . . . | | |
| Flit N-1 329M | Client Data 322M | | |
| Flit N 329N | Client Data 322N | Tag 323 | |

FIG. 3B

300C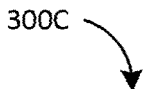

Non-Operational (NOP) Frame 330

| Flit 1 339A | Header Field 331 | NOP Data 332A | |
| Flit 2 339B | NOP Data 332B | | |
| . . . | . . . | | |
| Flit N-1 339M | NOP Data 332M | | |
| Flit N 339N | NOP Data 332N | Error Check Field 333 | |

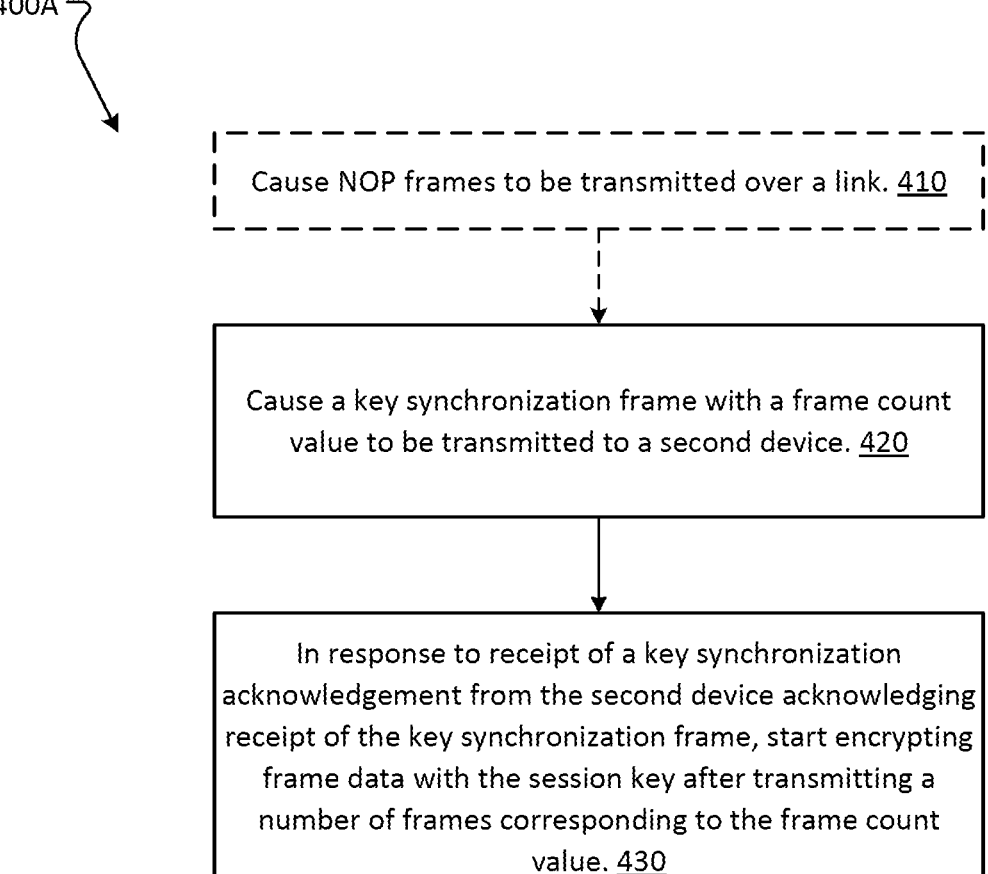

Cause NOP frames to be transmitted over a link. 410

Cause a key synchronization frame with a frame count value to be transmitted to a second device. 420

In response to receipt of a key synchronization acknowledgement from the second device acknowledging receipt of the key synchronization frame, start encrypting frame data with the session key after transmitting a number of frames corresponding to the frame count value. 430

FIG. 4A

400B
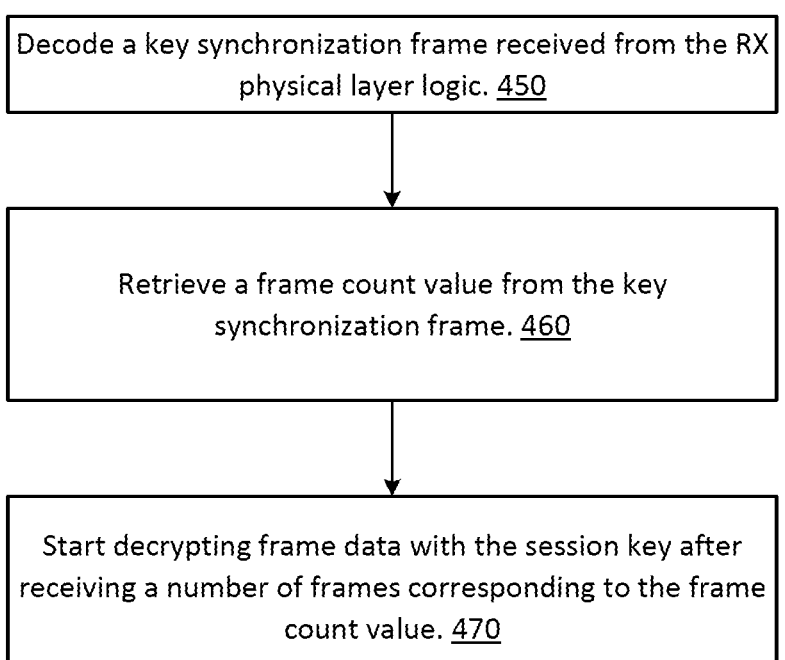
Decode a key synchronization frame received from the RX physical layer logic. 450
Retrieve a frame count value from the key synchronization frame. 460
Start decrypting frame data with the session key after receiving a number of frames corresponding to the frame count value. 470
FIG. 4B Receiver Datalink Layer (DL) 216B

FIG. 5A

Retrieve frame count value. 550

Track count of received NOP frames. 567

Receive # of frames corresponding to the frame count value? 570

NO

YES

Switch from plaintext to encryption pipeline. 590

Start to decrypt the frame data with the session key. 595

Transmitter Datalink Layer (DL) 215A

FIG. 5A

Track count of transmitted NOP frames. 555

Transmit # of frames corresponding to frame count value? 565

NO

YES

Switch from plaintext to encryption pipeline. 575

Start to encrypt frame data with session key. 580

Cause encrypted frame data to be transmitted. 585

SYNCHRONIZING AN ENCRYPTED DATA STREAM ACROSS CHIP-TO-CHIP GROUND REFERENCED SIGNALING INTERCONNECT

TECHNICAL FIELD

At least one embodiment pertains to processor communications over a link, such as a datalink. For example, at least one embodiment pertains to synchronizing an encrypted data stream across chip-to-chip ground referenced signaling.

BACKGROUND

In certain chip-to-chip communication systems, including chip-to-chip (C2C) ground referenced signaling (GRS) architecture, data transmitted across an interconnect link is often segmented into smaller units, commonly known as "frames," to facilitate efficient data handling. To preserve synchronization between chips connected by the link, a continuous stream of frames is transmitted across the link without stalling. In some cases, each chip operates with a different software protocol stack. While the link transitions from non-secure to a secure state, the link transmits and receives data to not lose synchronization. Once the link is operational, it is not guaranteed that session keys to start an encrypted session are available at a remote link partner. Thus, a key synchronization operation may be performed to ensure sessions keys are available to both link partners and that both link partners enter the secure state simultaneously.

BRIEF DESCRIPTION OF DRAWINGS

Various embodiments in accordance with aspects of the disclosure will be described with reference to the drawings, in which:

FIG. 3A is an example representation of an unencrypted frame transmitted and received across a link in a chip-to-chip interconnect, according to aspects of the disclosure.

FIG. 3B is an example representation of an encrypted frame transmitted and received across a link in a chip-to-chip interconnect, according to aspects of the disclosure.

FIG. 3C is example representation of a non-operational (NOP) frame transmitted and received across a link in a chip-to-chip interconnect, according to aspects of the disclosure.

FIG. 4A is an example flow diagram of a method for key and secure data synchronization across the link from a perspective of initiating a secure session, according to aspects of the disclosure.

FIG. 4B is an example flow diagram of a method for key and secure data synchronization across the link from a perspective of being initiated into a secure session, according to aspects of the disclosure.

FIG. 5A-FIG. 5B are an example flow diagram of a method for transitioning into a secure session over a link in a chip-to-chip interconnect, according to aspects of the disclosure.

DETAILED DESCRIPTION

Figure 1:
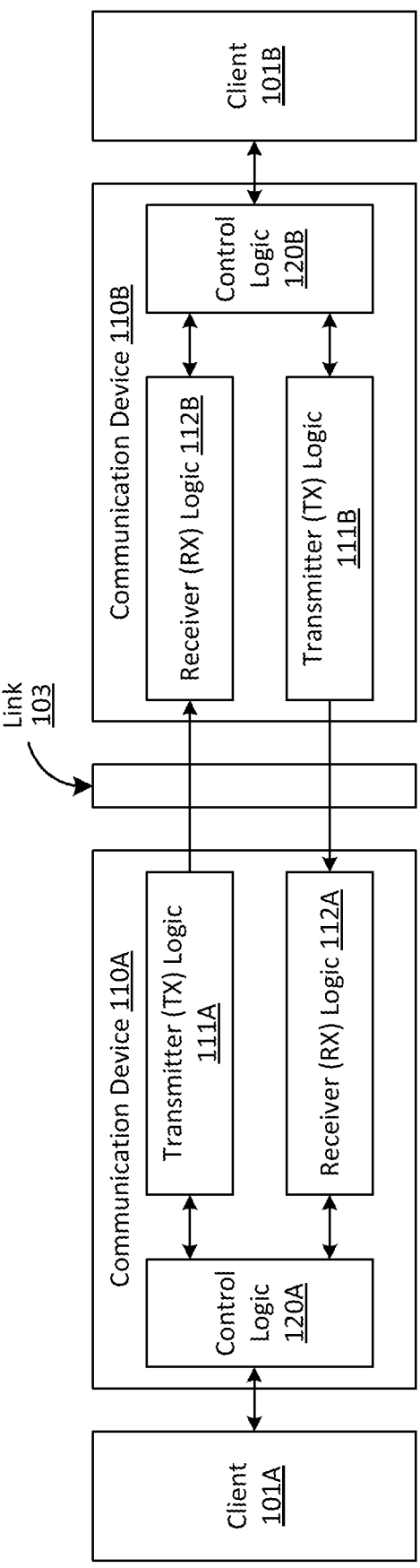
FIG. 1 is a block diagram of an example chip-to-chip interconnect, according to aspects of the disclosure.

Data can be processed by multiple coupled integrated circuits (ICs) that may each perform different-sometimes specialized-functions. Often these ICs are colloquially referred to as 'chips,' with reference to the final stages of the semiconductor manufacturing process where the ICs (e.g., the chips) are cut from a larger semiconductor wafer. Thus, a 'chip-to-chip interconnect' can describe an electrical and data coupling (e.g., interconnect) between at least two distinct ICs (e.g., chips). In some cases, each of these ICs operates with a different software stack, yet still need to be synchronized due to high-speed streaming needs.

One interconnect type employs chip-to-chip (C2C) ground referenced signaling (GRS) architecture, which may be understood as a method used in electronic systems for communication between different chips or ICs. This architecture may be used in the field of digital electronics and high-speed communication. The fundamental idea behind C2C GRS is to use a common ground reference for all the communicating chips. This is opposed to differential signaling, where signals are transmitted as the difference between two wires. In GRS, each signal wire is referenced to a common ground, which simplifies the design and can reduce costs.

In using GRS, one of the main concerns in C2C communication is signal integrity. Thus, GRS architecture may help maintain signal quality by reducing noise and interference that can be introduced through different ground potentials in a system. A common ground helps in achieving a cleaner signal path. Link layer synchronization in a C2C interconnect is achieved by consistently transmitting and receiving frames in both directions at a regular rate (e.g., an active link). Here, a 'frame' refers to a defined unit of data with a predetermined size. Often, it is more efficient to maintain an active link between chips rather than pausing and restarting the link based on data availability, and some physical links require an active link to constantly stream. Therefore, even in the absence of client data to be encapsulated in frames, empty frames, or frames without processable data, are still transmitted and received to maintain basic link layer synchronization.

The integrity of the chip-to-chip interconnect is upheld by data within each transmitted and received frame. Typically, each frame may contain header information, which may include information about the transmitting device, the link, and other relevant aspects of the interconnect. To ensure data accuracy, frames often carry error-checking data, such as cyclic redundancy check (CRC) data. The CRC data may be used to validate the integrity of the data communicated across the interconnect. In some configurations, the CRC data for an outgoing frame is generated based on header information from a recently received frame.

In certain configurations, frames are structured into multiple subframes, each of a fixed size. When a subframe is transmitted at a frequency of one per clock cycle, it is referred to as a 'flit.' In these scenarios, the initial flit of a frame typically contains the header information, while the final flit contains the CRC data. Frames carrying client data are often termed 'client frames' (i.e., of the client frame type). Conversely frames without client data are referred to as non-operational (NOP) frames (i.e., of the NOP frame type). These NOP frames may carry non-client data, such as information about the link, or the chip-to-chip interconnect. In contrast, some NOP frames may not contain processable data (e.g., irrelevant, or dummy data) and are transmitted and received solely to maintain the link.

To transition from communicating NOP frames to communicating secure client frames, a key synchronization operation may be performed to ensure sessions keys are available to both link partners and that both link partners enter a secure state simultaneously, despite the potential existence of bit errors in the physical layer. Key synchronization ensures that keys are available across the transmit and receive device pair and moves to a secure state by switching the traffic stream from a plaintext pipeline (or engine) to an encryption pipeline (or engine). In the absence of key synchronization, an encryption engine and a linked decryption engine can lose a mutually-synchronized relationship, generate indefinite tag authentication errors, and bring the link down. Further, without encryption synchronization within a secure session, the decrypted data would become unreliable/useless.

Aspects and embodiments of the disclosure address these and other challenges by providing, within paired communication devices (or IC chips) of an interconnect link, mutual timing of the start of encrypting and decrypting data to a particular frame and optionally to a particular flit of that particular frame. For example, an encryption engine of an initiating chip and a decryption engine of a joining chip (e.g., joining into an initiated secure session) can agree on the first encrypted frame and remain synchronized. In this way, there is a precise timing in transitioning from transmitting plaintext frames to transmitting encrypted frames by the initiating chip and from receiving plaintext frames to decrypting the encrypted frames by the joining chip.

In at least some embodiments, a first interconnect device or chip (e.g., initiating chip) includes a memory to store a session key, transmitter (TX) physical layer to transmit frames to a second device over a link, and TX datalink logic coupled to the TX physical layer and the memory. The TX datalink logic may be configured to coordinate synchronized encryption over the link with the second device. For example, in some embodiments, the TX datalink logic causes a key synchronization frame to be transmitted to the second device, where the key synchronization frame includes a frame count value. In response to receipt of a key synchronization acknowledgement from the second device acknowledging receipt of the key synchronization frame, the TX datalink logic may start encrypting frame data with the session key after transmitting a number of frames corresponding to the frame count value.

In at least some other embodiments, a second interconnect device or chip (e.g., joining chip or the second device referred to above) includes a memory to store a session key, receiver (RX) physical layer to receive frames from the first interconnected device over a link, and RX datalink logic coupled to the RX physical layer and the memory. In embodiments, to coordinate synchronized encryption over the link with the first interconnect device (e.g., the initiating chip), the RX datalink logic decodes a key synchronization frame received from the RX physical layer, retrieves the frame count value from the key synchronization frame, and starts decrypting frame data with the session key after receiving a number of frames corresponding to the frame count value.

Advantages of the disclosure include, but are not limited to, performing key synchronization to enter a secure data communication session between chips in an interconnect link despite having bit error(s) in the physical layer, e.g., a bit flip during the synchronization process. Other advantages include, but are not limited to, ensuring that a session key is available in both transmit and receive chips (or devices) across a link, switching the link from a non-secure to a secure state at the same time, optionally blocking client data from transmitted frames when the link is not secure, starting encryption and decryption on the same frame (and optionally the same flit of the same frame), and guaranteeing successful synchronization across an unreliable link. Further, bits that indicate which encryption key to use and that trigger encryption or decryption during communication need not be employed in each encrypted frame, freeing up bits within the frame for more client data, for example. These and other advantages will be discussed hereinafter, as would be apparent to those skilled in the art of interconnect links between ICs.

FIG. 1 is an example block diagram of a chip-to-chip interconnect 100, according to aspects of the disclosure. The chip-to-chip interconnect 100 includes client 101A and client 101B (also referred to herein as "client 101" or "client 101A/B") connected by link 103 via respectively coupled to communication device 110A and communication device 110B (also referred to herein as "communication device 110" or "communication device 110A/B"). Each communication device 110 respectively includes transmitter logic 111A and transmitter logic 111B (also referred to herein as "transmitter logic 111" or "transmitter logic 111A/B") and receiver logic 112A and receiver logic 112B (also referred to herein as "receiver logic 112" or "receiver logic 112A/B") that are coupled to control logic 120A and control logic 120B, respectively. In various embodiments, the chip-to-chip interconnect 100 has a GRS architecture, which was discussed previously.

In embodiments, client 101 can be a computing or processing device that processes data in relation to a chip-to-chip interconnect 100. For example, client 101 can be a computer processing unit (CPU), a graphics processing unit (GPU), a data processing unit (DPU), a neural processing unit (NPU), an application-specific integrated circuit (ASIC), a field programmable gate array (FPGA), or the like. These computing devices (e.g., clients 101) can be implemented in components in devices referred to as machines, computers, servers, network devices, or the like.

In embodiments, link 103 may connect clients 101 of the chip-to-chip interconnect 100 (e.g., client 101A and client 101B) via respective communication devices (e.g., communication device 110A and communication device 110B). In some embodiments, link 103 can be an electrical link, radiofrequency (RF) link, optical link, or the like.

In embodiments, communication device 110 can be a device that interfaces with the client 101 to transmit and receive data over a two-way communication stream (e.g., link 103). As illustrated, communication device 110 is single device which includes transmitter logic 111 and receiver logic 112, however, in some embodiments, the functions of the communication device 110 can be performed by separate devices of the chip-to-chip interconnect 100. In some embodiments, the communication device 110 may include a transceiver (not illustrated). In some embodiments, the communication device 110 may include a processor and/or communication device logic (not illustrated).

In embodiments, the communication device 110 is paired to a client 101 in a chip-to-chip interconnect 100. As illustrated, the chip-to-chip interconnect 100 includes two clients (e.g., client 101A and client 101B) that are paired to respective communication devices (e.g., communication device 110A and communication device 110B). The client 101 may cause the communication device 110 to transmit and receive data across the link 103 with another client. For example, client 101A may cause the communication device 110A to transmit data to the client 101B via the communication device 110B. Each client 101 may cause data to be received across the link 103 from another client via the coupled communication device 110. For example, client 101B may cause the communication device 110B to provide data to the client 101B that is received from client 101A via communication device 110A.

In embodiments, the communication device 110 includes transmitter logic 111 and receiver logic 112. In some embodiments, some, or all of the transmitter logic 111 can be included in a transmitter or transceiver (not illustrated). In some embodiments, some or all of the receiver logic 112 can be included in a receiver or transceiver (not illustrated). transmitter logic 111 may generate and transmit frames including data from the client 101 across the link 103 to another communication device 110. For example, the transmitter logic 111A may generate and transmit frames across the link 103 to the communication device 110B. The receiver logic may receive and process frames including data from the client 101 across the link 103 from another communication device 110. For example, the receiver logic 112B may receive and process frames including data from the client 101A across the link 103 via the communication device 110B. Additional details regarding the communication device 110, including details regarding the transmitter logic 111 and the receiver logic 112, are described with reference to FIGS. 2A-2B, below.

In embodiments, the communication device 110 includes control logic 120. The control logic 120 can cause the communication device 110 to perform one or more functions, such as transmitting and receiving communications across the link 103. In some embodiments, the control logic 120 causes the communication device 110 to transmit a communication across the link 103, using the transmitter logic 111. That is, the control logic 120 causes the transmitter logic 111 to transmit the communication. In some embodiments, the control logic 120 causes the communication device 110 to receive a communication across the link 103 using the receiver logic 112. That is, the control logic 120 causes the receiver logic 112 to receive the communication. Additional details regarding the control logic 120 are described with reference to FIG. 2, below.

Figure 2A:
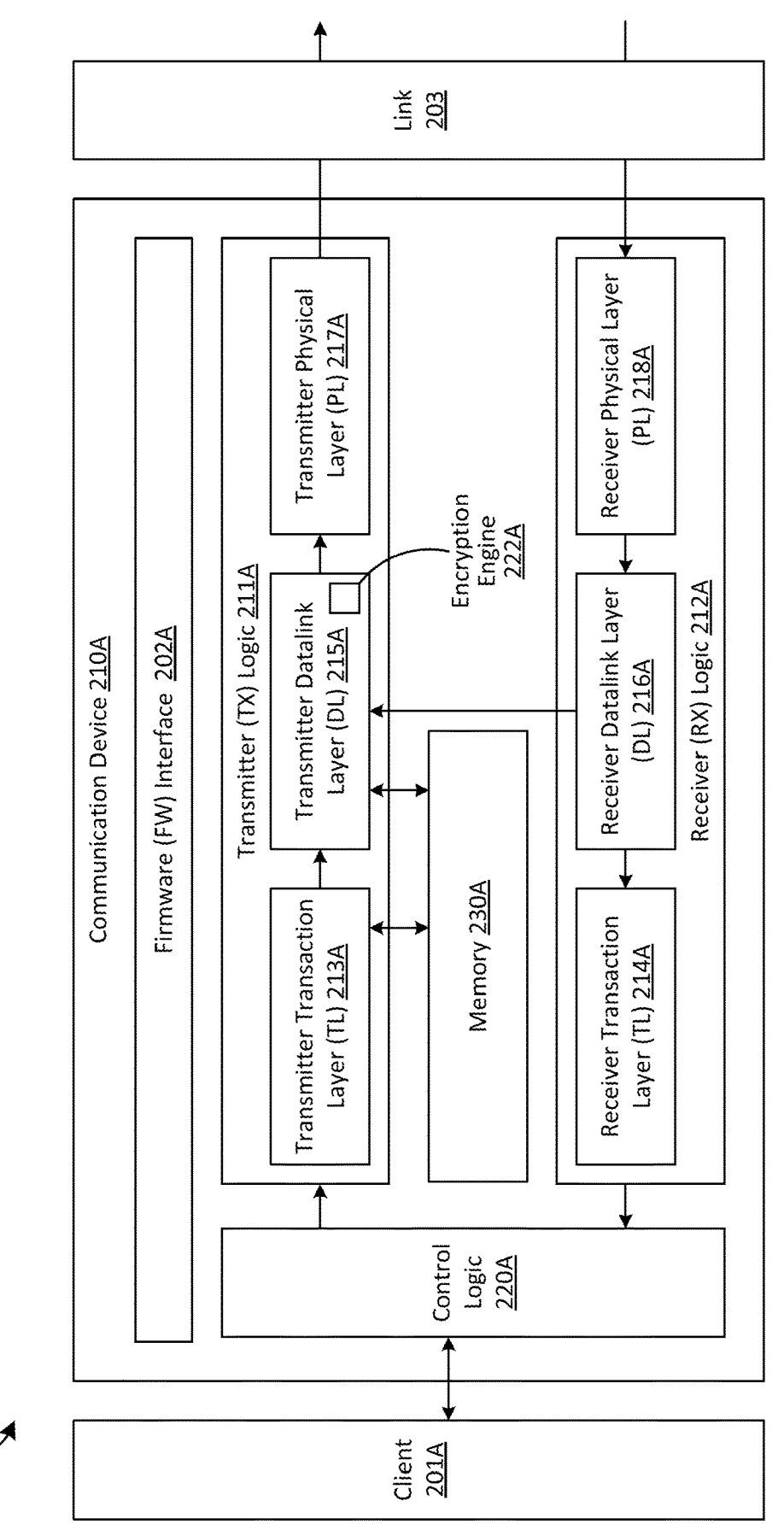
FIG. 2A is a block diagram of an example first communication device in a chip-to-chip interconnect, according to aspects of the disclosure.
Figure 2B:
FIG. 2B is a block diagram of an example second communication device in a chip-to-chip interconnect, according to aspects of the disclosure.

FIG. 2A is an example block diagram of a first communication device 210A in a chip-to-chip interconnect 200 and FIG. 2B is a block diagram of an example second communication device in the chip-to-chip interconnect 200, according to aspects of the disclosure. In various embodiments, the chip-to-chip interconnect 200 has a GRS architecture, which was discussed previously. As will be evident, the functionality of similarly-labeled components between the first communication device 210A and the second communication device 210B is similar (or symmetrical) as performed on different sides of a link 203 interposed therebetween. Thus, in some cases, a component in one of the first or second communications devices 210A or 210B is explained, but not both. Further, the same link 203 is illustrated in both FIGS.

2A-2B to facilitate explanation, but each instance of the link 203 should be understood to be the same.

In some embodiments, a first client 201A is coupled to the first communication device 210A (including first transmitter logic 211A, first receiver logic 212A, first control logic 220A, and first memory 230A) and a second client 201B is coupled to the second communication device 210B (including second transmitter logic 211B, second receiver logic 212B, second control logic 220B, and second memory 230B). In some embodiments, each of the first and second communication device 210A or 210B is the same as, or similar to, the communication device 110 of FIG. 1 (including the control logic 120, the transmitter logic 111, and the receiver logic 112). Likewise, in some embodiments, the chip-to-chip interconnect 200, including the first client 201A, the second client 201B, and the link 203 can be the same as, or similar to, the chip-to-chip interconnect 100, client 101, and link 103 respectively, of FIG. 1.

In representative embodiments, the first control logic 220A causes the first communication device 210A to transmit and receive communications across the link 203. A primary clock (e.g., control clock, not illustrated) for the first communication device 210A can be used to perform the operations of the first control logic 220A. In some embodiments, one or more operations of the first transmitter logic 211A and/or the first receiver logic 212A can be performed using the primary clock. Secondary clocks, such as a transmitter logic clock (not illustrated), or a receiver logic clock (not illustrated) can be synchronized to the primary clock. In some embodiments, the first control logic 220 is active using the primary clock while the first transmitter logic 211A and/or the first receiver logic 212A are not active. For example, a transmitter logic clock can be gated for a certain number of primary clock cycles. In another example, a receiver logic clock can be gated for a certain number of primary clock cycles. During this time, operations of the first control logic 220A can continue to be performed, while operations of the first transmitter logic 211A and/or receiver logic 212A are not being performed.

In some embodiments, the first transmitter logic 211A includes a first transmitter transaction layer 213A, a first transmitter datalink layer 215A having TX datalink logic, and a first transmitter physical layer 217A. Similarly, the second transmitter logic 211B includes a second transmitter transaction layer 213A, a second transmitter datalink layer 215A, and a second transmitter physical layer 217A. In some embodiments, the operations of the first transmitter logic 211A are performed using a secondary clock or transmitter logic clock. In some embodiments, operations at the first transmitter transaction layer 213A, the first transmitter datalink layer 215A, and the first transmitter physical layer 217A are performed using the transmitter logic clock. In alternative embodiments, the transmitter logic clock synchronizes individual clocks for each of the first transmitter transaction layer 213A, the first transmitter datalink layer 215A, and/or the first transmitter physical layer 217A. Similar clock functionality may be available to the second transmitter logic 211B (FIG. 2A).

In at least some embodiments, the first communication device 210A includes a first firmware (FW) interface 202A coupled between a first processing device (e.g., that executes firmware and/or software) and the first control logic 220A and optionally is also coupled to the first transmitter logic 211A and the first receiver logic 212A. In embodiments, the first FW interface 202A is configured to receive a session key (e.g., upon being powered up or between secured sessions) from the processing device so that the session key may be programmed to the first memory 230A. For example, the first control logic 220A or first TX datalink logic of the first transmitter datalink layer 215A may store the session key to the first memory 230A. The session key may be an encryption key or pair of encryption keys that the first TX datalink logic may employ to encrypt client data as will be described in more detail. In some embodiments, the first TX datalink logic (of the first transmitter datalink layer 215A) detects when the session key has been programmed or is otherwise available before transmitting a key synchronization frame to the second communication device 210B.

In similar embodiments, the second communication device 210B includes a second firmware (FW) interface 202B coupled between a second processing device (e.g., that executes firmware and/or software) and the second control logic 220B and optionally is also coupled to the second transmitter logic 211B and the second receiver logic 212B. In embodiments, the second FW interface 202B is configured to receive the session key (e.g., upon being powered up or between secured session) from the processing device so that the session key may be programmed to the second memory 230B. For example, the second control logic 220B or second RX datalink logic of the second receiver datalink layer 216B may store the session key to the second memory 230B. The session key may be an encryption key or pair of encryption keys that the second RX datalink logic may employ to decrypt client data as will be described in more detail. In some embodiments, the second RX datalink logic (of the second receiver datalink layer 216B) detects when the session key has been programmed or is otherwise available before transmitting a key synchronization frame to the second communication device 210B.

In some embodiments, the session key or pair of session keys is a first session key (or first pair of session keys) selected for use on a per-direction basis, e.g., from the first communication device 210A to the second communication device 210B across the link 203. Another or second session key that is different than the first session key may be employed for encryption in the other direction, e.g., from the second communication device 210B to the first communication device 210A across the link 203. For streamlined description herein, only the first direction of encryption is explained.

In embodiments, the first memory 230A and/or the second memory 230B include volatile memory, which can be tightly coupled memory, to operate as cache or otherwise provide a hardware buffer to store a session key and other parameters, information, and/or data for processing by the first or second communication device 210A or 210B. In some embodiments, the first memory 230A and/or the second memory 230B include a secure data store, such as a hardware security module (HSM), e.g., a dedicated hardware component designed to protect cryptographic keys and operations. In other embodiments, a combination of the FW interface 202A, the control logic 212A (or the RX/TX datalink logic), and the first or second memory 230A or 230B makes up a secure enclave or a trusted platform module (TPM) that provides secure storage and processing environments for sensitive data like encryption keys. In some embodiments, this secure enclave or TPM also includes aspects (hardware and/or firmware) of the processing device that provides the session key.

At the first transmitter transaction layer 213A, the first communication device 210A can receive communications from the first client 201A that are to be sent to the second communication device 210B over the link 203. In some embodiments, as illustrated, the first transmitter transaction layer 213A can interface with the first client 201A through the first control logic 220A. In alternative embodiments, the first transmitter transaction layer 213A can directly interface with the first client 201A. In some embodiments, the first transmitter transaction layer 213A can store data received from the first client 201A in a cache (e.g., client data cache) at the first memory 230A.

At the first transmitter datalink layer 215A, the first communication device 210A can convert the message and/or data received from the first client 201A into one or more messages that can be sent over the link 203 to the second communication device 210B (FIG. 2B). The first communication device 210A transmits data as frames which include multiple flits, as is further described with reference to FIGS. 3A-C. In some embodiments, the first transmitter datalink layer 215A accesses the client data at the first memory 230 when generating frames to transmit across the link 203. In some embodiments, the first transmitter datalink layer 215A also receives a key synchronization acknowledgement from the second communication device 210B (e.g., via the first receiver logic 212A) acknowledging receipt of the key synchronization frame. Upon receipt of the key synchronization frame, the first transmitter datalink layer 215A may track a plurality of frames that are transmitted according to the frame count value, which had been included in the key synchronization frame. To track or count down through the plurality of frames, the first transmitter datalink layer 215A may employ a counter or hardware functional equivalent to a counter. The first transmitter datalink layer 215A may also start encrypting the frame data of a frame that is transmitted after transmitting a final frame of the plurality of frames.

In some embodiments, the first transmitter datalink layer 215A generates frames containing client data as long as client data is stored in the first memory 230A (e.g., cached in the first memory 230A). In some embodiments, once client data is no longer stored in first memory 230A, the first transmitter datalink layer logic 215A generates frames that do not contain client data. In some embodiments, the first control logic 220A prevents the first transmitter datalink layer 215A from generating new data for the frame.

In some embodiments, a frame contains header information, data to be transmitted, and error-correction information. The first transmitter datalink layer 215A can generate a frame by generating the header information, obtaining data to be transmitted from a data pipeline, and generating error-correction information. In some embodiments, header information can be generated based on error-correction information obtained from a received frame (e.g., as illustrated by the arrow from the first receiver datalink layer 216A to the first transmitter datalink layer 215A). In some embodiments, the data pipeline can include client data, such as client data cached to first memory 230A (e.g., by the first transmitter transaction layer 213A). In some embodiments, the data pipeline can include data that is temporarily stored in physical components associated with the data pipeline (e.g., one or more registers, etc.). In some embodiments, the first control logic 220A causes the first transmitter datalink layer 215A to use already-available data (e.g., data stored in the data pipeline for a previous frame) as the data for a data frame. In some embodiments, the error-correction information can be cyclic redundancy check (CRC) information related to the frame. In other embodiments, additional error-correction information and methods are considered, including checksums, cryptographic error-checking methods, and the like.

At the first transmitter physical layer 217A, the first communication device 210A can transmit, via the first transmitter logic 211A, the frame generated at the first transmitter datalink layer 215A across the link 203. In some embodiments, the first transmitter physical layer 217A is associated with physical hardware for physically coupling the first communication device 210 to physical components of the link 203 (e.g., bonded wires, conductive traces, decouplable pins or connectors, etc.). In some embodiments, at the first transmitter physical layer 217A, the first transmitter logic 211A converts the generated frame into one or more digital signals representative of data stored in the data frame. The digital signals can then be transmitted across the link 203 as a frame of data.

In some embodiments, while transmitting NOP frames (because a secure session has not yet been established), TX datalink logic of the first transmitter datalink layer 215A causes a key synchronization frame to be transmitted to the second communication device 210B. The key synchronization frame may include a frame count value that may, as will be described in more detail with reference to FIGS. 4A-4B and FIGS. 5A-5B, be used for counting down to the frame at which the first communication device 210A begins encrypting client data and the second communication device 210B begins decrypting that client data, e.g., in a secure session using the aforementioned session key.

In embodiments, the first receiver logic 212A includes a first receiver transaction layer 214A, a first receiver datalink layer 216A, and a first receiver physical layer 218A. Similarly, in embodiments, the second receiver logic 212B includes a second receiver transaction layer 214B, a second receiver datalink layer 216B, and a second receiver physical layer 218B. In some embodiments, the operations of the first receiver logic 212A can be performed using a secondary clock, or receiver logic clock. In some embodiments, operations at the first receiver transaction layer 214A, the first receiver datalink layer 216A, and the first receiver physical layer 218A are performed using the first receiver logic clock 212A. In alternative embodiments, the first receiver logic clock 212A synchronizes individual clocks for each of the first receiver transaction layer 214A, the first receiver data-link layer 216A, and/or the first receiver physical layer 218A. Similar clock functionality is available to the second receiver logic 212B (FIG. 2B).

In some embodiments herein, a combination of the first transmitter datalink layer 215A and the first receiver datalink layer 216A may be referred to as first datalink logic. Further, in such embodiments, a combination of the second transmitter datalink layer 215B and the second receiver datalink layer 216B may be referred to as second datalink logic.

In some embodiments, while the first receiver logic 212B may also operate as follows, functionality of the second receiver logic 212B is instead described. At the second receiver physical layer 218B, the second communication device 210B can receive, via the second receiver logic 212B, a frame from the first communication device 210B across the link 203. In some embodiments, the second receiver physical layer 218B is associated with physical hardware for physically coupling the second communication device 210B to physical components of the link 203 (e.g., bonded wires, conductive traces, decouplable pins or connectors, etc.). In some embodiments, at the second receiver physical layer 218B, the second receiver logic 212B converts the received frame (e.g., which can be the key synchronization frame) from one or more digital signals representative of data stored in the key synchronization frame generated by the first communication device 210B into a data frame. The second receiver physical layer 218B provides the received key synchronization frame to the second receiver datalink layer 216B, which includes RX datalink logic.

At the second receiver datalink layer 216B, the second communication device 210B can extract the data received from the frame (e.g., which can be the key synchronization frame) received over the link 203 from the first communication device 210A. The received frame can include multiple flits, as is further described in FIGS. 3A-C. In some embodiments, the second receiver datalink layer 216B performs one or more operations on the error-correction information included in the frame to verify the contents of the frame. If the frame is complete (e.g., not corrupted or otherwise damaged), in some embodiments, the second receiver datalink layer 216B provides data generated by verifying the error correction data to the second transmitter datalink layer 215B for use in generating header information for an outgoing frame. In some embodiments, the header information from the received frame can similarly be provided to the second transmitter datalink layer 215B.

The second receiver datalink layer 216B can provide the data extracted from the received frame to the second receiver transaction layer 214B. In some embodiments, the extracted data is client data from another client, e.g., the first communication device 210A (FIG. 2A). In alternative embodiments, the extracted data is not client data, but data such as link information data, dummy data, or the like. In some embodiments, the second control logic 220B can prevent the second receiver datalink layer 216B from extracting data from the received frame. The second receiver datalink layer 216B can provide the extracted data to the second receiver transaction layer 214B.

At the second receiver transaction layer 214B, the second communication device 210A can provide communications (e.g., data, frames, and the like) from another communication device such as the first communication device 210A. In some embodiments, the second receiver transaction layer 214B, or another component of the second communication device 210B such as the second control logic 220B can reconstruct data obtained from multiple frames at the second receiver datalink layer 216B, into a cohesive dataset. In some embodiments, as illustrated, the second receiver transaction layer 214B can interface with the second client 201B through the second control logic 220B. In alternative embodiments, the second receiver transaction layer 214B can directly interface with the second client 201B.

In one or more embodiments, when encryption begins, the TX datalink logic of the transmitter datalink layer 215A may switch from a plaintext pipeline to an encryption pipeline that includes an encryption engine 222A. In embodiments, the encryption engine 222A employs the programmed session key to encrypt client data starting at a particular frame associated with expiration of the frame count value. Further, when encryption begins, RX datalink logic of a first receiver datalink layer 216B may switch from a plaintext pipeline to a decryption pipeline that includes a decryption engine 222B. In embodiments, the decryption engine 222B employs the programmed session key to start decrypting the encrypted client data starting at the particular frame associated with expiration of the frame count value. In this way, the first transmitter logic 211A of the first communication device 210A and the second receiver logic 212B of the second communication device 210B work in tandem, using the same frame count value, to start an encrypted or secure session at the same frame.

In some embodiments, the first and second communications devices 210A and 210B may exchange NOP frames before the start of the encryption, and thus the start frame for the secure session may include client data that has been buffered by the first transmitter logic 211A (e.g., in the memory 230B) in preparation to encrypt and transmit the client data. These operations for communicating about and simultaneously starting the secure session between the first and second communication devices 210A and 210B will be discussed in more detail with reference to FIGS. 4A-4B and FIGS. 5A-5B.

FIG. 3A is an example representation 300A of an unencrypted frame 310 transmitted and received across a link in a chip-to-chip interconnect, according to aspects of the disclosure. In some embodiments, the unencrypted frame 310 includes flits 319A-N (e.g., flit 1 319A, flit 2 319B, flit N−1 319M, and flit N 319N, etc.). Flit 1 319A includes header field 311, and client data 312A (e.g., unencrypted client data). In embodiments, header field 311 may include frame identification (ID) acknowledgement information (e.g., from previously, or simultaneously received frames), sender ID information, a frame count value (e.g., if the unencrypted frame 310 is a key synchronization frame), and/or recipient ID information, etc.

In embodiments, client data can be divided into multiple portions of unencrypted client data, such as client data 312A, client data 312B, client data 312M, and client data 312N. In embodiments, the client data included in flit 1 319A (e.g., with header field 311) and the client data included in flit N 319N (e.g., with the error check field 313) can be of a smaller size than the client data included in intermediate flits (e.g., client data 312B of flit 2 319B, client data 312M of flit N−1 319M, etc.).

Flit N 319N of unencrypted frame 310 includes client data 312N and error check field 313. Error check field 313 may include information used for verifying that the frame has successfully been transmitted/received. In embodiments, error check field 313 may include checksum information, CRC information, or similar error checking information. In embodiments, header field 311 can be included in another flit of unencrypted frame 310. In embodiments, error check field 313 can be included in another flit of unencrypted frame 310 (e.g., flit 1 319A).

FIG. 3B is an example representation 300B of an encrypted frame 320 transmitted and received across a link in a chip-to-chip interconnect, according to aspects of the disclosure. In some embodiments, the encrypted frame 320 includes flits 329A-N (e.g., flit 1 329A, flit 2 329B, flit N−1 329M, and flit N 329N, etc.). Flit 1 329A includes header field 321, and client data 322A (e.g., encrypted client data). In embodiments, header field 321 may include frame identification (ID) acknowledgement information (e.g., from previously, or simultaneously received frames), sender ID information, and/or recipient ID information, etc.

In embodiments, client data can be divided into multiple portions of encrypted client data, such as client data 322A, client data 322B, client data 322M, and client data 322N. In embodiments, the client data included in flit 1 329A (e.g., with header field 321) and the client data included in flit N 329N (e.g., with the error check field 323) can be of a smaller size than the client data included in intermediate flits (e.g., client data 322B of flit 2 329B, client data 322M of flit N−1 329M, etc.).

Flit N 329N of encrypted frame 320 includes client data 322N and error check field 323. Error check field 323 may include information used for verifying that the frame has successfully been transmitted/received. In embodiments, error check field 323 may include checksum information, CRC information, or similar error checking information. In embodiments, header field 321 can be included in another flit of encrypted frame 320. In embodiments, error check field 323 can be included in another flit of encrypted frame 320 (e.g., flit 1 329A).

FIG. 3C is example representation 300C of a non-operational (NOP) frame 330 transmitted and received across a link in a chip-to-chip interconnect, according to aspects of the disclosure. In some embodiments, the NOP frame 330 includes flits 339A-N (e.g., flit 1 339A, flit 2 339B, flit N−1 339M, and flit N 339N, etc.). Flit 1 339A includes header field 331 and NOP data 332A. In embodiments, header field 331 of NOP frame 330 may include similar information as header field 311 of unencrypted frame 310 (see FIG. 3A).

In embodiments, NOP data can be divided into multiple portions of NOP data, such as NOP data 332A, NOP data 332B, and through to NOP data 332N. Similar to the client data of unencrypted frame 310, the NOP data 332A included in flit 1 339A and the NOP data 332N included in flit N 339N can be of a smaller size than the client data included in intermediate flits (e.g., NOP data 332B of flit 2 339B, NOP data 332M of flit N−1 339M, etc.). In embodiments, the NOP data 332A (as well as the NOP data 332B, NOP data 332M, and NOP data 332N) can be data that is not client data. For example, NOP data may include processable data, such as link control data (e.g., data used to maintain, establish, or alter the link connection), operational information, background processing tasks, and other non-client data. In another example, NOP data does not include processable data, which may include dummy data, junk data, reused data, pseudo-random data.

FIG. 4A is an example flow diagram of a method 400A for key and secure data synchronization across the link from a perspective of initiating a secure session, according to aspects of the disclosure. The method 400A can be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400A is performed by TX datalink logic of the transmitter datalink layer 215A of FIG. 2A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic transmit optionally causes NOP frames to be transmitted over a link to a second device, e.g., the second communication device 210B. The NOP frames may be transmitted to provide initial synchronization between devices of the chip-to-chip interconnect 200 (FIGS. 2A-2B).

At operation 420, the processing logic causes a key synchronization frame to be transmitted to the second device, e.g., the second communication device 210B. In embodiments, the key synchronization frame includes a frame count value.

At operation 430, the processing logic, in response to receipt of a key synchronization acknowledgement from the second device acknowledging receipt of the key synchronization frame, starts encrypting frame data with the session key after transmitting a number of frames corresponding to the frame count value.

FIG. 4B is an example flow diagram of a method 400B for key and secure data synchronization across the link from a perspective of being initiated into a secure session, according to aspects of the disclosure. The method 400B can be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400B is performed by the RX datalink logic of the receiver datalink layer 216B of FIG. 2B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 450, the processing logic decodes a key synchronization frame received from the RX physical layer 218B. In embodiments, the key synchronization frame is received over the link from the first communication device 210A (see FIG. 4A).

At operation 460, the processing logic retrieves a frame count value from the key synchronization frame.

At operation 470, the processing logic starts decrypting frame data with the session key after receiving a number of frames corresponding to the frame count value.

Figure 5A:
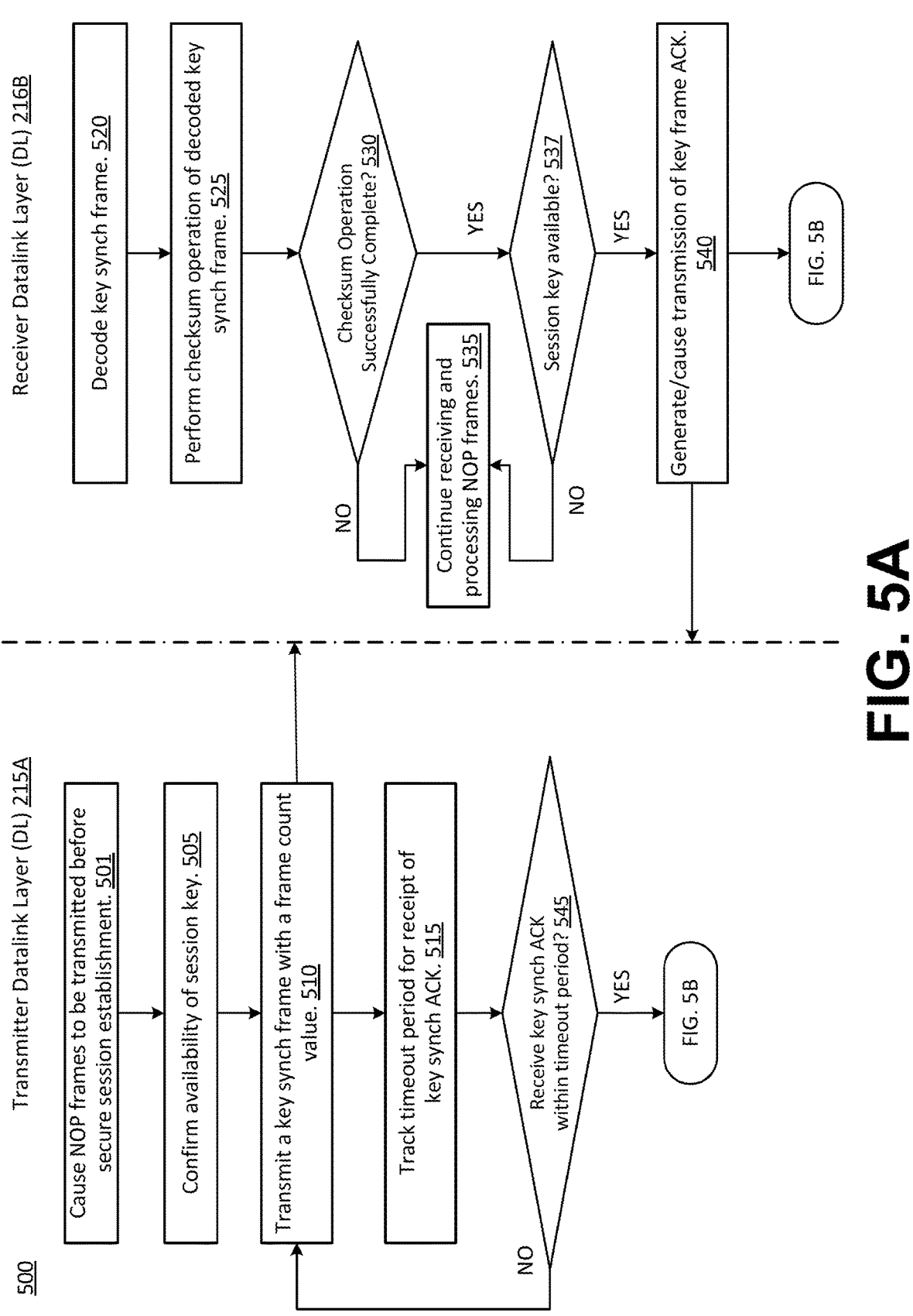

FIG. 5A-FIG. 5B are an example flow diagram of a method 500 for transitioning into a secure session over a link in a chip-to-chip interconnect, according to aspects of the disclosure. The method 500 can be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed, in part, by the transmitter datalink layer 215A of the first communication device 210A (FIG. 2A) and, in part, by the receiver datalink layer 216B of the second communication device 210B (FIG. 2B), among possibly other components of the first and second communication devices 210A and 210B. Other components of the chip-to-chip interconnect 200 may also be referenced in relation to the method 500. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 501, the processing logic (e.g., TX datalink logic of the transmitter datalink layer 215A) causes NOP frames to be transmitted before establishing a secure session. For example, the processing logic may cause client data frames to be blocked and NOP frames to instead be transmitted over the link until encryption of the frame data is started or begins. Further, while not illustrated, a first chip (e.g., the first client 201A) may detect a powerup of the chip-to-chip interconnect 200. A processing device of the first chip (or of another system computing device) may further program the session key to first memory 230A accessible by the first datalink logic.

At operation 505, the processing logic confirms availability of a session key in the memory to be used for encrypted data in a secure session that will be established.

At operation 510, the processing logic causes a key synchronization frame to be transmitted to the second communication device 210B, e.g., in response to confirming the session key is available. In embodiments, the key synchronization frame includes a frame count value.

At operation 515, the processing logic tracks a timeout period for receipt of the key synchronization acknowledgement, from the second communication device 210B, acknowledging receipt of the key synchronization frame. In some embodiments, the timeout period is associated with roundtrip latency of the key synchronization frame and the key synchronization acknowledgement. In embodiments, the frame count value is multiple times greater than the timeout period measured in clock cycles, thus reducing delay in waiting to receive the key synchronization acknowledgement in getting the secure session started.

At operation 520, the processing logic (e.g., RX datalink logic of the second receiver datalink layer 216B) decodes the key synchronization frame received from the RX physical layer 218B. Further, while not illustrated, a second chip (e.g., the second client 201B) may detect a powerup of the chip-to-chip interconnect 200. A processing device of the second chip (or of another system computing device) may further program the session key to second memory 230B accessible by the second datalink logic.

At operation 525, the processing logic performs a checksum operation of the decoded key synchronization frame.

At operation 530, the processing logic determines whether the checksum operation successfully completed. If the checksum operation does not successfully complete, at operation 535, the processing logic continues receiving and processing NOP (or unencrypted) frames being transmitted in advance of establishing a secure session.

At operation 537, the processing logic determines whether the session key is available. For example, has the session key been programmed in the first communication device 210B, and is thus available in the second memory 230B or other secure key storage. If the session key is not available, at operation 535, the processing logic continues receiving and processing NOP frames being transmitted in advance of establishing a secure session. Moving to operation 535 likely means that the timeout period (operation 515) will expire and the key synchronization frame will be retransmitted to continue attempting to establish the secure session. In this situation, frame count tracking will restart as will the timeout period upon transmission of the key synchronization frame. But, by continuing to send and receive/process NOP frames while waiting on the key synchronization process to complete, the chip-to-chip interconnect 200 may satisfy physical layer (PHY) streaming requirements while maintaining link layer synchronization during the switch between the insecure (or unencrypted) communication to the secure (or encrypted) communication.

At operation 540, in response to the checksum operation successfully completing, at operation 530, and confirming the availability of the session key, at operation 537, the processing logic generates a key synchronization acknowledgment. In embodiments, TX datalink logic coupled between the second RX datalink logic 216B and the link 203 causes the key synchronization acknowledgement to be transmitted over the link 203 to the first communication device 210A. Thus, in at least some embodiments, the key synchronization acknowledgement includes an acknowledgement of receipt of the key synchronization frame and availability, to the second communication device 210B, of the session key. In some embodiments, operations 530 and 537 are swapped and/or are performed in parallel, and are thus illustrated executed in one of several possible, nonlimiting embodiments.

At operation 545, the processing logic (e.g., the TX datalink logic of the first transmitter datalink layer 215A) determine whether the key synchronization acknowledgment has been received from the second communication device 210B within the timeout period. In response to failing to receive the key synchronization acknowledgment within the timeout period, at operation 510, the processing logic causes retransmission of the key synchronization frame to the second device. In this way, the chip-to-chip interconnect 200 does not incur too much of a delay (e.g., due to a data error in attempting to establish the secure session) before reattempting to synchronize into secure operation by retransmitting the key synchronization frame to the second communication device 210B.

A further part of the method 500 (related to operation 545) may involve the RX datalink logic of the first receiver datalink layer 216A (FIG. 2A), which may be configured to decode the key synchronization acknowledgement, perform a checksum operation of the key synchronization acknowledgement, and provide the decoded key synchronization acknowledgement to the TX datalink logic (e.g., of the first transmitter datalink layer 215A) in response to successful completion of the checksum operation. In this way, the TX datalink logic may ultimately safely receive the key synchronization acknowledgement.

With reference to FIG. 5B, at operation 550, the processing logic (e.g., of the second receiver datalink layer 216B) retrieves a frame count value from the key synchronization frame. Of course, retrieving the frame count value may be performed at any time after receiving the key synchronization frame, and is ordered at this point in the method 500 flow for ease of explanation.

At operation 555, the processing logic tracks a plurality of frames, e.g., of the NOP frames that are transmitted. This plurality of frames may be tracked to be compared against the frame count value, as will be checked at operation 565. In some embodiments, these NOP frames may be counted using a counter, for example.

At operation 565, the processing logic (e.g., TX datalink logic of the first transmitter datalink layer 215A) determines whether a number of frames corresponding to the frame count value have been transmitted. For example, the processing logic may check the tracked plurality of frames (at operation 555) to see if the tracked frames that have been transmitted match or satisfy the frame count value. If the number of frames do not yet satisfy the frame count value, the processing logic may loop back to operation 555 while sending additional NOP frames. In some embodiments, tracking the frames in this way includes tracking flits of the frames so that encryption begins at a particular flit within a particular frame according to the frame count value (e.g., the countdown started at a particular flit as well).

At operation 567, the processing logic (e.g., RX datalink logic of the second receiver datalink layer 216B) tracks a plurality of frames (e.g., NOP frames) that are received according to the frame count value, e.g., using a counter or the like.

At operation 570, the processing logic (e.g., RX datalink logic of the second receiver datalink layer 216B) determines whether a number of frames corresponding to the frame count value have been received. If the number of frames do not yet satisfy the frame count value, the processing logic may continue to loop back to operation 567, receiving and tracking additional NOP frames. In some embodiments, tracking the frames in this way includes tracking flits of the frames so that encryption begins at a particular flit within a particular frame according to the frame count value (e.g., the countdown started at a particular flit).

At operation 575, the processing logic (e.g., TX datalink logic of the first transmitter datalink layer 215A) switches from a plaintext pipeline to an encryption pipeline in response to the first transmitter logic 211A having transmitted the number of frames corresponding to the frame count value. In embodiments, the encryption pipeline includes and employs the encryption engine 222A (FIG. 2A).

At operation 580, the processing logic starts encrypting the frame data at a frame that is transmitted after transmitting a final frame of the plurality of frames. In some embodiments, the timing of starting to encrypt frames is at a particular flit of a particular frame that coincides with expiration of the frame count value.

At operation 585, the processing logic causes the encrypted frame data to be transmitted, e.g., by the transmitter physical layer 217A.

At operation 590, the processing logic (e.g., the RX datalink logic of the receiver datalink layer 216B) switches from a plaintext pipeline to an encryption pipeline in response to receiving the number of frames corresponding to the frame count value, making way to start decrypting received client data at operation 595. In embodiments, the decryption pipeline includes and employs the decryption engine 222B (FIG. 2B).

At operation 595, the processing logic starts decrypting frame data with the session key after. The processing logic may pass the decrypted data to the receiver transaction layer 214B, e.g., to be passed to the second control logic 220B and onto the second client 201B. In some embodiments, once a secure session is established and client data is being encrypted before being transmitted across the link 203, there is no need to continue using a checksum algorithm to check for data integrity, saving bandwidth from having to transmit CRC bits. This additional advantage may be because the encryption pipelines naturally have a checksum process built into the encryption pipelines.

Computer Systems

Figure 6:
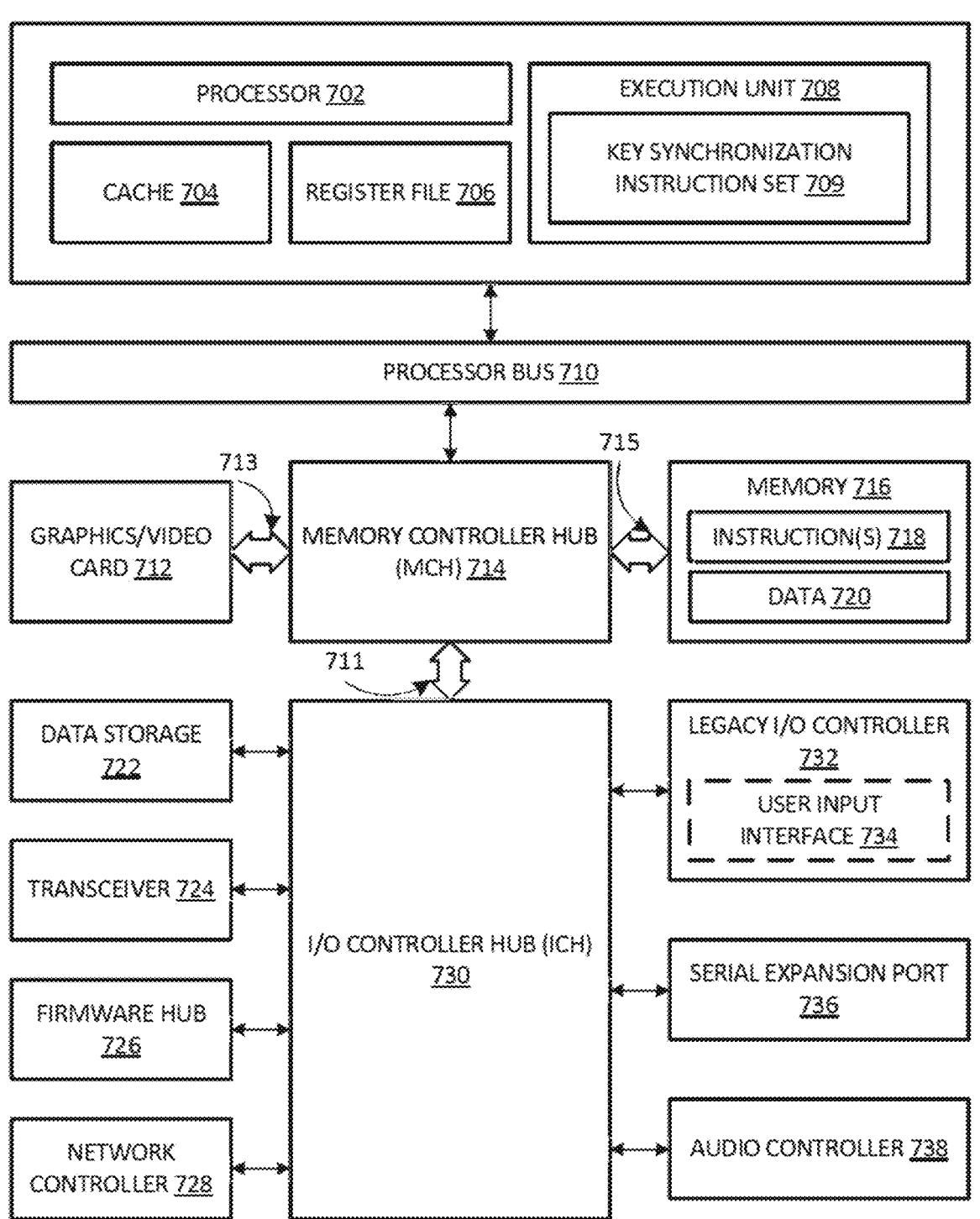
FIG. 6 is a block diagram illustrating an exemplary computer system which can be a system with interconnected devices and components, a system-on-a-chip (SOC), or some combination thereof, according to aspects of the disclosure.

FIG. 6 is a block diagram illustrating an exemplary computer system, such as computer system 700, which can be a system with interconnected devices and components, a system-on-a-chip (SOC), or some combination thereof, according to aspects of the disclosure. In some embodiments, computer system 700 can include, without limitation, a component, such as a processor 702, to employ execution units including logic to perform algorithms for process data, in accordance with the present disclosure, such as in the embodiments described herein. In some embodiments, computer system 700 can include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) can also be used. In some embodiments, computer system 700 can execute a version of WINDOWS' operating system available from Microsoft Corporation of Redmond, Wash., although other operating systems (UNIX and Linux, for example), embedded software, and/or graphical user interfaces, can also be used.

Embodiments can be used in other devices such as handheld devices and embedded applications. Some examples of handheld devices include cellular phones, Internet Protocol devices, digital cameras, personal digital assistants (PDAs), and handheld PCs. In some embodiments, embedded applications can include a microcontroller, a digital signal processor (DSP), a system on a chip, network computers (NetPCs), set-top boxes, network hubs, wide area network (WAN) switches, or any other system that can perform one or more instructions in accordance with at least one embodiment.

In some embodiments, computer system 700 can include, without limitation, processor 702 that can include, without limitation, one or more execution units 708 to perform operations according to techniques described herein. In some embodiments, computer system 700 is a single-processor desktop or server system, but in another embodiment, the computer system 700 can be a multiprocessor system. In some embodiments, processor 702 can include, without limitation, a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In some embodiments, processor 702 can be coupled to a processor bus 710 that can transmit data signals between processor 702 and other components in computer system 700.

In some embodiments, processor 702 can include, without limitation, a Level-1 (L1) internal cache memory (cache) cache 704. In some embodiments, processor 702 can have a single internal cache or multiple levels of internal cache. In some embodiments, the cache memory can reside external to processor 702. Other embodiments can also include a combination of both internal and external caches depending on particular implementation and needs. In some embodiments, register file 706 can store different types of data in various registers, including and without limitation, integer registers, floating-point registers, status registers, and instruction pointer registers.

In some embodiments, an execution unit 708, including and without limitation, logic to perform integer and floating-point operations, also reside in processor 702. In some embodiments, processor 702 can also include a microcode (ucode) read-only memory (ROM) that stores microcode for certain macro instructions. In some embodiments, execution unit 708 can include logic to handle key synchronization instruction set 709. In some embodiments, by including key synchronization instruction set 709 in an instruction set of a general-purpose processor, such as processor 702, along with associated circuitry to execute instructions, operations used by many multimedia applications can be performed using packed data in a general-purpose processor, such as processor 702. In one or more embodiments, many multimedia applications can be accelerated and executed more efficiently by using the full width of a processor's data bus for performing operations on packed data, which can eliminate the need to transfer smaller units of data across the processor's data bus to perform one or more operations one data element at a time.

In some embodiments, execution unit 708 can also be used in microcontrollers, embedded processors, graphics devices, DSPs, and other types of logic circuits. In some embodiments, computer system 700 can include, without limitation, a memory 716. In some embodiments, memory 716 can be implemented as a Dynamic Random Access Memory (DRAM) device, a Static Random Access Memory (SRAM) device, a flash memory device, or other memory devices. In some embodiments, memory 716 can store instruction(s) 718 and/or data 720 represented by data signals that can be executed by processor 702.

In some embodiments, the system logic chip can be coupled to processor bus 710 and memory 716. In some embodiments, the system logic chip can include, without limitation, a memory controller hub (MCH), such as MCH 714, and processor 702 can communicate with MCH 714 via processor bus 710. In some embodiments, MCH 714 can provide a high bandwidth memory path 715 to memory 716 for instruction and data storage and for storage of graphics commands, data, and textures. In some embodiments, MCH 714 can direct data signals between processor 702, memory 716, and other components in computer system 700 and bridge data signals between processor bus 710, memory 716, and a system input/output (I/O) 711. In some embodiments, a system logic chip can provide a graphics port for coupling to a graphics controller. In some embodiments, MCH 714 can be coupled to memory 716 through a high bandwidth memory path 715, and graphics/video card 712 can be coupled to MCH 714 through an Accelerated Graphics Port (AGP) interconnect 713.

In some embodiments, computer system 700 can use system I/O 711 that is a proprietary hub interface bus to couple the MCH 714 to I/O controller hub (ICH), such as ICH 730. In some embodiments, ICH 730 can provide direct connections to some I/O devices via a local I/O bus. In some embodiments, a local I/O bus can include, without limitation, a high-speed I/O bus for connecting peripherals to memory 716, chipset, and processor 702. Examples can include, without limitation, data storage 722, a transceiver 724, a firmware hub (flash Basic Input/Output System (BIOS)) 726, a network controller 728, a legacy I/O controller 732 containing a user input interface 734, a serial expansion port 736, such as Universal Serial Bus (USB), and an audio controller 738. In some embodiments, data storage 722 can include a hard disk drive, a floppy disk drive, a compact disc read-only memory (CD-ROM) device, a flash memory device, or other mass storage devices.

In some embodiments, FIG. 6 illustrates a computer system 700, which includes interconnected hardware devices or "chips," whereas, in other embodiments, FIG. 6 can illustrate an exemplary System on a Chip (SoC). In some embodiments, devices can be interconnected with proprietary interconnects, standardized interconnects (e.g., Peripheral Component Interconnect buses (e.g., PCI, PCI Express)), or some combination thereof. In some embodiments, one or more components of computer system 700 are interconnected using compute express link (CXL) interconnects.

Figure 7:
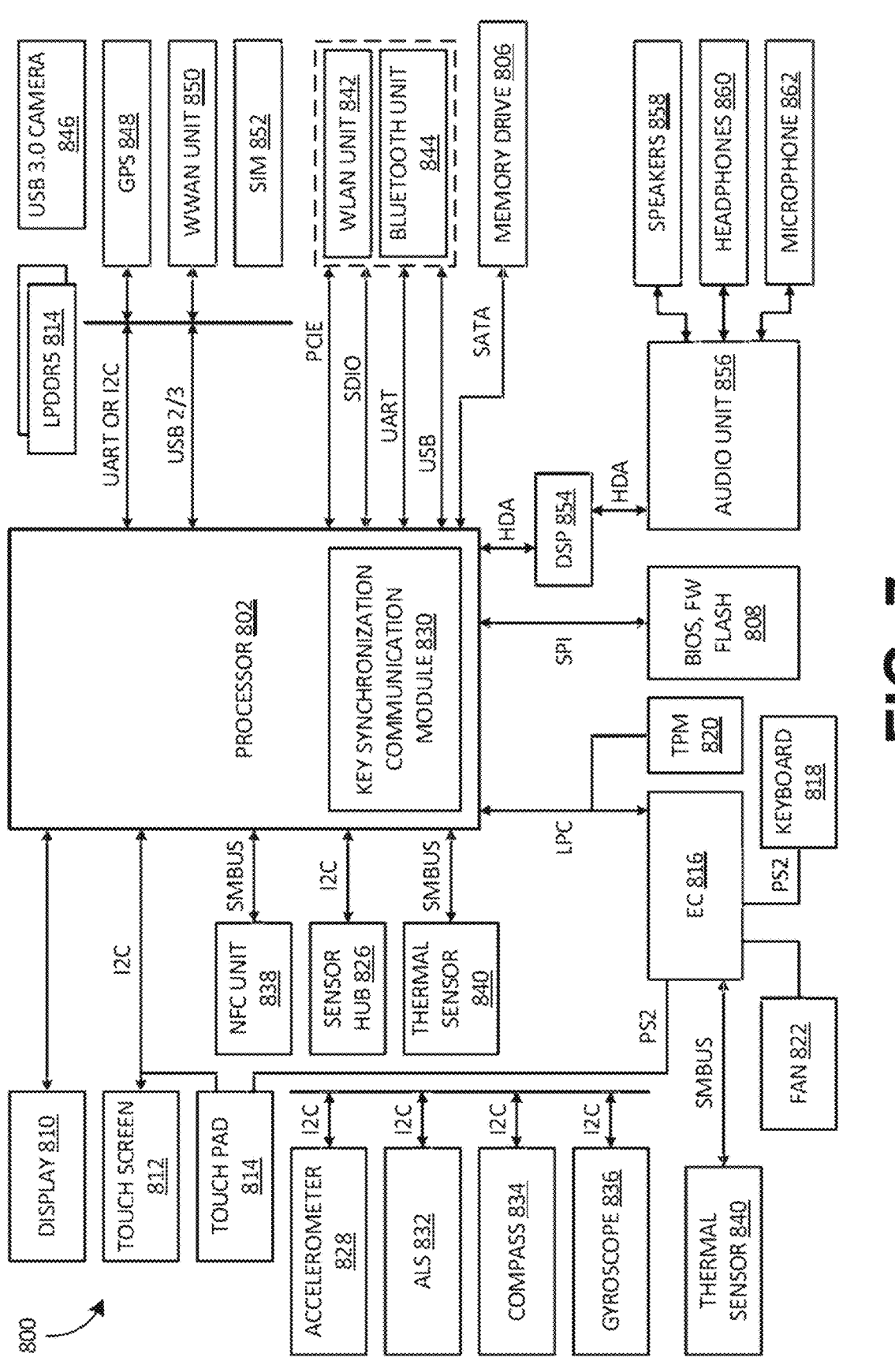
FIG. 7 is a block diagram illustrating an electronic device for utilizing a processor, according to aspects of the disclosure.

FIG. 7 is a block diagram illustrating an electronic device 800 for utilizing a processor 802, according to aspects of the disclosure. In some embodiments, electronic device 800 can be, for example, and without limitation, a notebook, a tower server, a rack server, a blade server, a laptop, a desktop, a tablet, a mobile device, a phone, an embedded computer, or any other suitable electronic device.

In some embodiments, electronic device 800 can include, without limitation, processor 802 communicatively coupled to any suitable number or kind of components, peripherals, modules, or devices. In some embodiments, processor 802 coupled using a bus or interface, such as an Inter-Integrated Circuit (I2C) bus, a System Management Bus (SMBus), a Low Pin Count (LPC) bus, a Serial Peripheral Interface (SPI), a High Definition Audio (HDA) bus, a Serial Advance Technology Attachment (SATA) bus, a Universal Serial Bus (USB) (including USB 1.0/1/1, USB 2.0, USB 3.0/3.1 Gen1/3.1 Gen2, and USB4), or a Universal Asynchronous Receiver/Transmitter (UART) bus. In some embodiments, FIG. 7 illustrates a system, which includes interconnected hardware devices or "chips," whereas in other embodiments, FIG. 7 can illustrate an exemplary System on a Chip (SoC). In some embodiments, devices illustrated in FIG. 7 can be interconnected with proprietary interconnects, standardized interconnects (e.g., PCIe), or some combination thereof. In some embodiments, one or more components of FIG. 7 are interconnected using compute express link (CXL) interconnects.

In some embodiments, FIG. 7 can include a display 810, a touch screen 812, a touch pad 814, a Near Field Communications unit (NFC) 838, a sensor hub 826, a thermal sensor 840, an Express Chipset (EC), such as EC 816, a Trusted Platform Module (TPM), such as TPM 820, BIOS/firmware (FW)/flash memory, such as BIOS, FW Flash 808, a DSP 854, a memory drive 806 such as a Solid State Disk (SSD) or a Hard Disk Drive (HDD), a wireless local area network unit (WLAN), such as WLAN unit 842, a Bluetooth unit 844, a Wireless Wide Area Network unit (WWAN), such as WWAN unit 850, a Global Positioning System (GPS) 848, a camera (USB 3.0 camera) 846, such as a USB 3.0 camera, and/or a Low Network bandwidth Double Data Rate (LPDDR) memory unit, such as LPDDR5 804 implemented in, for example, LPDDR5 standard. These components can each be implemented in any suitable manner.

In some embodiments, other components can be communicatively coupled to processor 802 through the components discussed above. In some embodiments, processor 802 can include a key synchronization transmission module 830. In some embodiments, an accelerometer 828, Ambient Light Sensor (ALS), such as ALS 832, compass 834, and a gyroscope 836 can be communicatively coupled to sensor hub 826. In some embodiments, thermal sensor 840, a fan 822, a keyboard 818, and a touch pad 814 can be communicatively coupled to EC 816. In some embodiments, speakers 858, headphones 860, and microphone 862 can be communicatively coupled to an audio unit 856 which can, in turn, be communicatively coupled to DSP 854. In some embodiments, audio unit 856 can include, for example, and without limitation, an audio coder/decoder (codec) and a class-D amplifier. In some embodiments, a subscriber identification module (SIM) card, such as SIM 852 can be communicatively coupled to WWAN unit 850. In some embodiments, components such as WLAN unit 842 and Bluetooth unit 844, as well as WWAN unit 850 can be implemented in a Next Generation Form Factor (NGFF).

Figure 8:
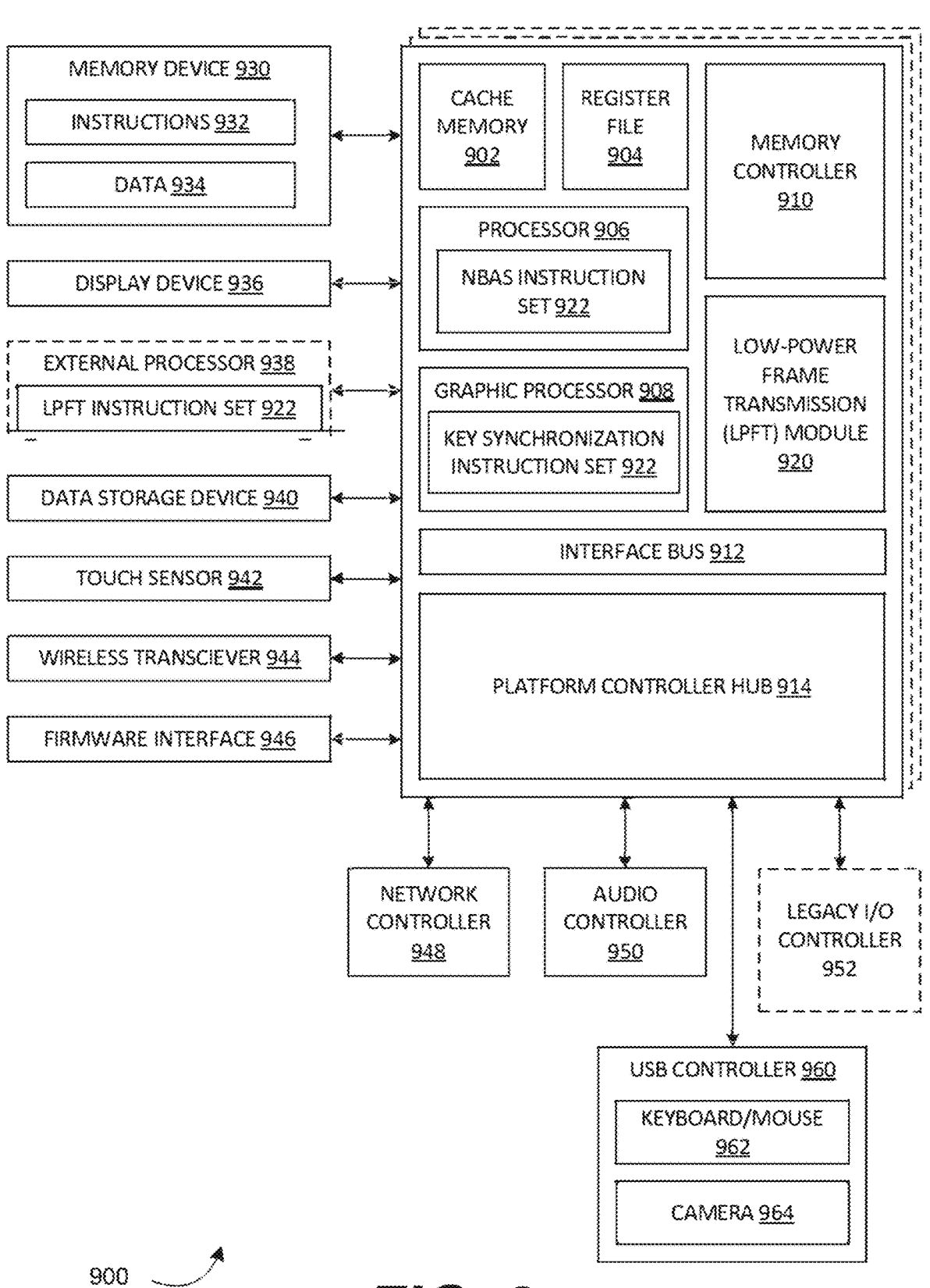
FIG. 8 is a block diagram of a processing system, according to aspects of the disclosure.
Figure 9:
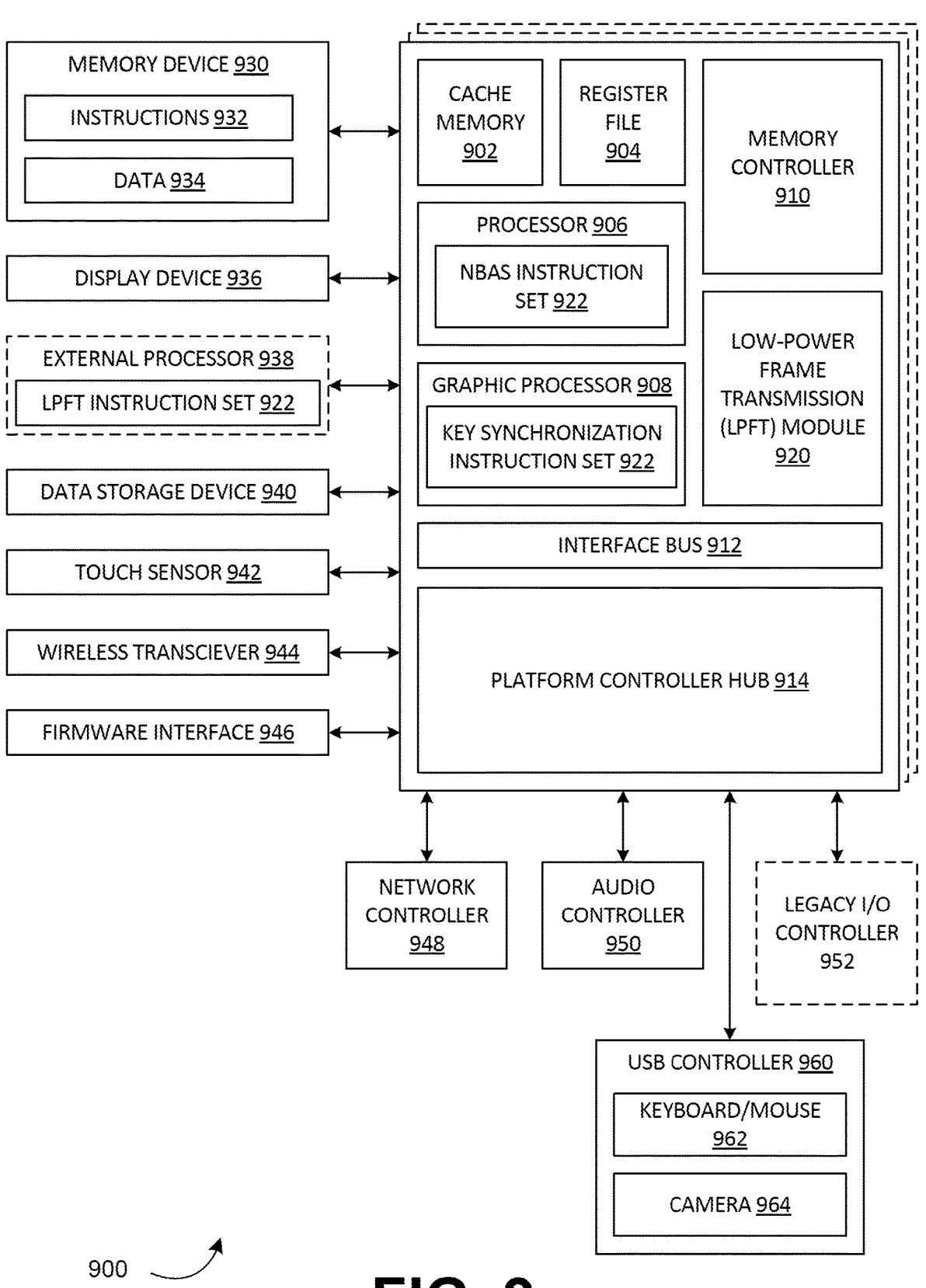

FIG. 8 is a block diagram of a processing system 900, according to aspects of the disclosure. In some embodiments, the processing system 900 includes cache memory 902, register file 904, processors 906, graphics processors 908, memory controller 910, interface bus 912, platform controller hub 914, and key synchronization transmission module 920. Processing system 900 can be a single processor desktop system, a multiprocessor workstation system, or a server system having a large number of processors 906 or graphics processors 908. In some embodiments, the processing system 900 is a processing platform incorporated within a system-on-a-chip (SoC) integrated circuit for use in mobile, handheld, or embedded devices.

In some embodiments, the processing system 900 can include, or be incorporated within a server-based gaming platform, a game console, including a game and media console, a mobile gaming console, a handheld game console, or an online game console. In some embodiments, the processing system 900 is a mobile phone, smart phone, tablet computing device, or mobile Internet device. In some embodiments, the processing system 900 can also include, couple with, or be integrated within, a wearable device, such as a smart watch wearable device, smart eyewear device, augmented reality device, or virtual reality device. In some embodiments, the processing system 900 is a television or set-top box device having one or more processors 906 and a graphical interface generated by one or more graphics processors 908.

In some embodiments, one or more processors 906 each include one or more of the processor cores to process instructions which, when executed, perform operations for system and user software. In some embodiments, one or more processors 906 and/or one or more graphics processors can be configured to process a portion of the key synchronization transmission instruction set, such as key synchronization instruction set 922. In some embodiments, the key synchronization instruction set 922 can facilitate Complex Instruction Set Computing (CISC), Reduced Instruction Set Computing (RISC), or computing via a Very Long Instruction Word (VLIW). In some embodiments, processor cores can each process a different instruction set from key synchronization instruction set 922, which can include instructions to facilitate emulation of other instruction sets (not illustrated). In some embodiments, processor cores can also include other processing devices, such as a Digital Signal Processor (DSP).

In some embodiments, processors 906 includes cache memory 902. In some embodiments, processors 906 can have a single internal cache or multiple levels of internal cache. In some embodiments, cache memory 902 is shared among various components of processors 906. In some embodiments, processors 906 also uses an external cache (e.g., a Level-3 (L3) cache or Last Level Cache (LLC)) (not illustrated), which can be shared among processor cores using known cache coherency techniques. In some embodiments, register file 904 is additionally included in processors 906, which can include different types of registers for storing different types of data (e.g., integer registers, floating-point registers, status registers, and an instruction pointer register). In some embodiments, register file 904 can include general-purpose registers or other registers.

In some embodiments, one or more processors 906 are coupled with one or more interface bus 912 to transmit communication signals such as address, data, or control signals between processor cores and other components in processing system 900. In some embodiments, interface bus 912, in one embodiment, can be a processor bus, such as a version of a Direct Media Interface (DMI) bus. In some embodiments, interface bus 912 is not limited to a DMI bus, and can include one or more PCI buses (e.g., PCI, PCI Express), memory busses, or other types of interface busses. In some embodiments, processors 906 include an integrated memory controller (e.g., memory controller 910) and a platform controller hub 914 (PCH). In some embodiments, memory controller 910 facilitates communication between a memory device and other components of the processing system 900, while platform controller hub 914 provides connections to I/O devices via a local I/O bus.

In some embodiments, the memory device 930 can be a dynamic random-access memory (DRAM) device, a static random-access memory (SRAM) device, a flash memory device, a phase-change memory device, or some other memory device having suitable performance to serve as process memory. In some embodiments, the memory device 930 can operate as system memory for processing system 900 to store instructions 932 and data 934 for use when one or more processors 906 executes an application or process.

In some embodiments, memory controller 910 also optionally couples with an external processor 938, which can communicate with one or more graphics processors 908 in processors 906 to perform graphics and media operations. In some embodiments, a display device 936 can connect to processors 906. In some embodiments, the display device 936 can include one or more of an internal display device, as in a mobile electronic device or a laptop device, or an external display device attached via a display interface (e.g., DisplayPort, etc.). In some embodiments, display device 936 can include a head-mounted display (HMD) such as a stereoscopic display device for use in virtual reality (VR) applications or augmented reality (AR) applications.

In some embodiments, the platform controller hub 914 enables peripherals to connect to memory device 930 and processors 906 via a high-speed I/O bus. In some embodiments, I/O peripherals include, but are not limited to, a data storage device 940 (e.g., hard disk drive, flash memory, etc.), a touch sensor 942, a wireless transceiver 944, firmware interface 946, a network controller 948, or an audio controller 950.

In some embodiments, the data storage device 940 can connect via a storage interface (e.g., SATA) or via a peripheral bus, such as a PCI bus (e.g., PCI, PCI Express). In some embodiments, touch sensor 942 can include touch screen sensors, pressure sensors, or fingerprint sensors. In some embodiments, wireless transceiver 944 can be a Wi-Fi transceiver, a Bluetooth transceiver, or a mobile network transceiver such as a 3G, 4G, Long Term Evolution (LTE), 5G, or 6G transceiver. In some embodiments, firmware interface 946 enables communication with system firmware and can be, for example, a unified extensible firmware interface (UEFI). In some embodiments, the network controller 948 can enable a network connection to a wired network. In some embodiments, a high-performance network controller (not illustrated) couples with interface bus 912. In some embodiments, audio controller 950 can be a multi-channel high-definition audio controller. In some embodiments, the processing system 900 includes an optional legacy I/O controller 952 for coupling legacy (e.g., Personal System-2 (PS/2)) devices to the processing system 900. In some embodiments, the platform controller hub 914 can also connect to one or more Universal Serial Bus (USB) controllers, such as USB controller 960 to connect input devices, such as a keyboard and mouse combination (keyboard/mouse 962), a camera 964, or other USB input devices.

In some embodiments, an instance of memory controller 910 and platform controller hub 914 can be integrated into a discreet external graphics processor, such as external processor 938. In some embodiments, the platform controller hub 914 and/or memory controller 910 can be external to one or more processors 906. For example, in some embodiments, the processing system 900 can include an external memory controller (e.g., memory controller 910) and the platform controller hub 914, which can be configured as a memory controller hub and peripheral controller hub within a system chipset that is in communication with the processors 906.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, on the contrary, the intention is to cover all modifications, alterna-tive constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. The term "connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. Use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and corresponding set can be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., can be either A or B or C, or any nonempty subset of a set of A and B and C. For instance, in an illustrative example of a set having three members, conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). A plurality is at least two items but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In some embodiments, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In some embodiments, code is stored on a computer-readable storage medium, for example, in form of a computer program comprising a plurality of instructions executable by one or more processors. In some embodiments, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In some embodiments, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. A set of non-transitory computer-readable storage media, in some embodiments, comprises multiple non-transitory computer-readable storage media and one or more of individual non-transitory storage media of multiple non-transitory computer-readable storage media lacks all of the code while multiple non-transitory computer-readable storage media collectively store all of the code. In some embodiments, executable instructions are executed such that different instructions are executed by different processors—for example, a non-transitory computer-readable storage medium stores instructions, and a main central processing unit (CPU) executes some of the instructions while a graphics processing unit (GPU) executes other instructions. In some embodiments, different components of a computer system have separate processors, and different processors execute different subsets of instructions.

Accordingly, in some embodiments, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples or exemplary language (e.g., "such as") provided herein is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, can be used. It should be understood that these terms cannot be intended as synonyms for each other. Rather, in particular examples, "connected" or "coupled" can be used to indicate that two or more elements are in direct or indirect physical or electrical contact with each other. "Coupled" can also mean that two or more elements are not in direct contact with each other but yet still co-operate or interact with each other.

Unless specifically stated otherwise, it can be appreciated that throughout specification terms such as "processing," "computing," "calculating," "determining," or like, refer to action and/or processes of a computer or computing system or similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" can refer to any device or portion of a device that processes electronic data from registers and/or memory and transform that electronic data into other electronic data that can be stored in registers and/or memory. As non-limiting examples, a "processor" can be a CPU or a GPU. A "computing platform" can comprise one or more processors. As used herein, "software" processes can include, for example, software and/or hardware entities that perform work over time, such as tasks, threads, and intelligent agents. Also, each process can refer to multiple processes for carrying out instructions in sequence or in parallel, continuously, or intermittently. The terms "system" and "method" are used herein interchangeably insofar as a system can embody one or more methods, and methods can be considered a system.

In the present document, references can be made to obtaining, acquiring, receiving, or inputting analog or digital data into a subsystem, computer system, or computer-implemented machine. Obtaining, acquiring, receiving, or inputting analog and digital data can be accomplished in a variety of ways, such as by receiving data as a parameter of a function call or a call to an application programming interface. In some implementations, the process of obtaining, acquiring, receiving, or inputting analog or digital data can be accomplished by transferring data via a serial or parallel interface. In another implementation, the process of obtaining, acquiring, receiving, or inputting analog or digital data can be accomplished by transferring data via a computer network from providing entity to acquiring entity. References can also be made to providing, outputting, transmitting, sending, or presenting analog or digital data. In various examples, the process of providing, outputting, transmitting, sending, or presenting analog or digital data can be accomplished by transferring data as an input or output parameter of a function call, a parameter of an application programming interface, or an interprocess communication mechanism.

Although the discussion above sets forth example implementations of described techniques, other architectures can be used to implement described functionality and are intended to be within the scope of this disclosure. Furthermore, although specific distributions of responsibilities are defined above for purposes of discussion, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A device comprising:

memory to store a session key;

a transmitter (TX) physical layer to transmit frames to a second device over a link; and TX datalink logic coupled to the TX physical layer and the memory, wherein, to coordinate synchronized encryption over the link with the second device, the TX datalink logic is to:

cause a key synchronization frame to be transmitted to the second device before the synchronized encryption, wherein the key synchronization frame comprises a frame count value; and in response to receipt of a key synchronization acknowledgement frame from the second device acknowledging receipt of the key synchronization frame, start encrypting frame data with the session key after transmitting a number of frames corresponding to the frame count value.

2. The device of claim 1, wherein the key synchronization acknowledgement also includes an acknowledgement of availability, to the second device, of the session key.

3. The device of claim 1, further comprising receiver (RX) datalink logic coupled to the TX datalink logic, the RX datalink logic to:

decode the key synchronization acknowledgement frame;

perform a checksum operation of the key synchronization acknowledgement frame; and provide the decoded key synchronization acknowledgement frame to the TX datalink logic in response to successful completion of the checksum operation.

4. The device of claim 1, wherein the TX datalink logic is further to:

confirm availability of the session key in the memory;

track a plurality of frames that are transmitted according to the frame count value; and start encrypting the frame data at a flit of a frame that is transmitted after transmitting a final frame of the plurality of frames.

5. The device of claim 1, wherein the TX datalink logic is further to:

cause client data frames to be blocked and no operation (NOP) frames to instead be transmitted over the link until encryption of the frame data is started; and switch from a plaintext pipeline to an encryption pipeline that employs the session key to encrypt the frame data.

6. The device of claim 1, wherein the TX datalink logic is further to:

track a timeout period for receipt of the key synchronization acknowledgement frame; and in response to failing to receive the key synchronization acknowledgement frame within the timeout period, cause retransmission of the key synchronization frame to the second device.

7. The device of claim 6, wherein the timeout period is associated with roundtrip latency of the key synchronization frame and the key synchronization acknowledgement frame, and wherein the frame count value is multiple times greater than the timeout period measured in clock cycles.

8. The device of claim 1, further comprising a firmware interface coupled between a processing device and the TX datalink logic and through which to receive the session key, wherein the TX datalink logic is to store the session key in the memory.

9. A device comprising:

memory to store a session key;

a receiver (RX) physical layer to receive frames from a second device over a link, wherein the frames comprise a key synchronization frame followed by encrypted frames; and RX datalink logic coupled to the RX physical layer and the memory, wherein, to coordinate synchronized encryption over the link with a second device, the RX datalink logic is to:

decode the key synchronization frame received from the RX physical layer;

retrieve a frame count value from the key synchronization frame;

retrieve the session key from the memory in response to the key synchronization frame passing a checksum operation; and start decrypting frame data retrieved from the encrypted frames with the session key after receiving a number of frames corresponding to the frame count value.

10. The device of claim 9, wherein the RX datalink logic is further to:

perform the checksum operation of the decoded key synchronization frame;

determine whether the session key is available in the memory; and in response to a successful completion of the checksum operation and availability of the session key, generate a key synchronization acknowledgment frame.

11. The device of claim 10, further comprising TX datalink logic coupled between the RX datalink logic and the link, the TX datalink logic to cause the key synchronization acknowledgement frame to be transmitted over the link to the second device.

12. The device of claim 10, wherein the key synchronization acknowledgement frame comprises an acknowledgement of receipt of the key synchronization frame and availability, to the second device, of the session key.

13. The device of claim 9, wherein the RX datalink logic is further to:

track a plurality of frames that are received according to the frame count value; and start decrypting the frame data, using an encryption pipeline, at a flit of a frame that is received after receiving a final frame of the plurality of frames.

14. The device of claim 9, further comprising a firmware interface coupled between a processing device and the RX datalink logic and through which to receive the session key, wherein the RX datalink logic is to store the session key in the memory.

15. A method of operating a chip-to-chip interconnect to coordinate synchronized encryption over a link coupled between a first device, which is coupled to a first chip, and a second device, which is coupled to a second chip, wherein the method comprises:

causing, by first datalink logic of the first device, a key synchronization frame to be transmitted to the second device before the synchronized encryption, wherein the key synchronization frame comprises a frame count value; and in response to receiving a key synchronization acknowledgement frame from the second device acknowledging receipt of the key synchronization frame:

determining, by the first datalink logic, when a plurality of frames corresponding to the frame count value have been transmitted; and starting to encrypt, by the first datalink logic, frame data with a session key based on the determining.

16. The method of claim 15, further comprising:

confirming, by first datalink logic of the first device, availability of the session key;

tracking, by the first datalink logic, transmission of the plurality of frames according to the frame count value; and starting to encrypt frame data, by the first datalink logic, at a flit of a frame that is transmitted after transmitting a final frame of the plurality of frames.

17. The method of claim 15, further comprising:

causing, by the first datalink logic, client data frames to be blocked and no operation (NOP) frames to instead be transmitted over the link until encryption of the frame data is started; and switching, by the first datalink logic, from a plaintext pipeline to an encryption pipeline that employs the session key to encrypt the frame data.

18. The method of claim 15, further comprising:

tracking, by the first datalink logic, a timeout period for receipt of the key synchronization acknowledgement; and in response to failing to receive the key synchronization acknowledgement within the timeout period, causing, by the first datalink logic, retransmission of the key synchronization frame to the second device.

19. The method of claim 18, wherein the timeout period is associated with roundtrip latency of the key synchronization frame and the key synchronization acknowledgement, and wherein the frame count value is multiple times greater than the timeout period measured in clock cycles.

20. The method of claim 15, wherein the key synchronization acknowledgement comprises an acknowledgement of receipt, by the second device, of the key synchronization frame and availability, to the second device, of the session key.

21. The method of claim 15, further comprising:

detecting, by the first chip, a powerup of the chip-to-chip interconnect; and programming, by a first processing device of the first chip, the session key to first memory accessible by the first datalink logic.

22. The method of claim 15, further comprising:

decoding, by second datalink logic of the second device, the key synchronization frame received over the link;

retrieving the frame count value from the decoded key synchronization frame; and starting to decrypt, by the second datalink logic, the frame data with the session key after receiving a number of frames corresponding to the frame count value.

23. The method of claim 22, further comprising:

performing, by the second datalink logic, a checksum operation of the decoded key synchronization frame;

determine whether the session key is available;

generating the key synchronization acknowledgment frame in response to a successful completion of the checksum operation and availability of the session key; and causing, by the second datalink logic, the key synchronization acknowledgement to be transmitted over the link to the second device.

24. The method of claim 22, further comprising:

tracking, by the second datalink logic, a plurality of frames that are received according to the frame count value; and starting to decrypt frame data, by the second datalink logic using an encryption pipeline, at a flit of a frame that is received after receiving a final frame of the plurality of frames.

25. The method of claim 22, further comprising:

detecting, by the second chip, a powerup of the chip-to-chip interconnect; and programming, by a second processing device of the second chip, the session key to second memory accessible by the second datalink logic.

* * * * *